United States Patent [19]

Sakai et al.

[11] Patent Number: 4,568,168
[45] Date of Patent: Feb. 4, 1986

[54] FOCUS DETECTING SYSTEM

[75] Inventors: Shinji Sakai, Yokohama; Takashi Kawabata, Kamakura, both of Japan

[73] Assignee: Canon Kabushiki Kaisha, Tokyo, Japan

[21] Appl. No.: 551,263

[22] Filed: Nov. 14, 1983

[30] Foreign Application Priority Data

Nov. 19, 1982 [JP] Japan .................. 57-202170

[51] Int. Cl.⁴ .................................................. G03B 3/10
[52] U.S. Cl. ...................................... 354/402; 354/406
[58] Field of Search .......................... 354/402, 406, 407

[56] References Cited

U.S. PATENT DOCUMENTS

| | | | |
|---|---|---|---|
| 4,132,888 | 1/1979 | Kondo | 354/406 |
| 4,341,953 | 7/1982 | Sakai et al. | 354/406 |
| 4,349,254 | 9/1982 | Jyojiki et al. | 354/406 |
| 4,429,966 | 2/1984 | Hosoe et al. | 354/406 |
| 4,453,818 | 6/1984 | Hayashi et al. | 354/406 |
| 4,459,006 | 7/1984 | Sakai et al. | 354/402 |
| 4,465,352 | 8/1984 | Hirobe et al. | 354/406 |

*Primary Examiner*—Russell E. Adams
*Attorney, Agent, or Firm*—Fitzpatrick, Cella, Harper & Scinto

[57] ABSTRACT

This specification discloses improvements in the so-called sharpness detection type algorism in which three light receiving means are provided near a predetermined focal plane and forwardly and rearwardly thereof to quantitatively detect the out-of-focus relative to the predetermined focal plane and the sharpnesses of the images at the positions of the three light receiving means are detected. More particularly, it discloses a technique whereby the range in which the amount of in-focus error can be detected is increased by using as a signal for normalizing an error signal a signal indicative of the difference between the sharpness of the image on the light receiving means disposed near the predetermined focal plane and the smaller one of the sharpnesses of the images on the light receiving means at the opposite ends.

10 Claims, 8 Drawing Figures

SHARPNESS SIGNAL

FOCUS DETECTING SYSTEM

BACKGROUND OF THE INVENTION

1. Field of the Invention

This invention relates to a focus detecting system.

2. Description of the Prior Art

As a device for detecting the amount of in-focus error, there is known a device as shown in FIG. 1 of the accompanying drawings wherein light receivers 2, 3 and 4 such as photoelectric conversion elements are disposed at optically equally spaced three points in the predetermined focal plane (film surface) of a photo-taking lens 1 and forward and rearward thereof. The words "equally spaced" include "substantially equally spaced". The light receivers 2, 3 and 4 are elements such as CCDs which convert the states of images formed thereon into electrical signals, and processing circuits 5, 6 and 7 are conventional circuits which put out sharpness signals $F_1$, $F_2$ and $F_3$, respectively, proportional to the sharpnesses of the images. These sharpness signals $F_1$, $F_2$ and $F_3$ vary as shown in FIG. 2 of the accompanying drawings for the movement of the focal plane from the predetermined focal plane. FIG. 2 may be schematically represented as shown in FIG. 3(A) of the accompanying drawings. In the Figure, O represents the predetermined focal plane position. The difference $(F_1 - F_3)$ between the sharpness signals $F_1$ and $F_3$, as shown in FIG. 3(B) of the accompanying drawings, exhibits a linear characteristic for out-of-focus in the range from the vicinities of the peak values of the sharpness signals $F_1$ and $F_3$ toward the predetermined focal plane side. Accordingly, the difference $(F_1 - F_3)$ can be used as an in-focus error signal.

However, the difference $(F_1 - F_3)$ is varied by the brightness of the object to be photographed or the like and therefore, it has already been proposed in the United States by applicant (Ser. No. 310,373) to divide the difference by the sum of the three signals $F_1$ to $F_3$ to thereby normalize it so as not to be varied by the brightness of the object to be photographed. However, the sum $(F_1 + F_2 + F_3)$ of the three signals, as shown in FIG. 3(B), varies more or less also in the relatively narrow vicinity of the predetermined focal plane and the value thereof sharply varies outside the vicinity of the predetermined focal plane and therefore, it has been unsuitable for normalizing said difference $(F_1 - F_3)$.

Also, the section in which the value of the sum $(F_1 + F_2 + F_3)$ of the three signals is relatively stable in the vicinity of the predetermined focal plane is limited to the section in which the value of the signal $F_2$ is greater than the values of the signals $F_1$ and $F_3$ and therefore, such section has been relatively narrow.

If the spacing between $F_1$ and $F_3$ is increased, the range in which the value of $F_1 + F_2 + F_3$ does not sharply vary can be widened, but if the spacing between $F_1$ and $F_3$ becomes greater, the inclination of the graph showing the signal between the focal point positions at which the signals $F_1$ and $F_3$ of the signal indicative of the difference $(F_1 - F_3)$ shown in FIG. 3(B) becomes smaller, and this has led to the disadvantage that the ratio at which the value of the in-focus error varies becomes small relative to the rate at which the photo-taking lens deviates from the in-focus position.

If an attempt is made to apply a conventional in-focus error amount detecting device having the above-noted disadvantage to an automatic focusing apparatus including an auto focus lens, the range in which the auto focus operation of the automatic focusing apparatus including the auto focus lens can be effected becomes very narrow because the range in which the amount of in-focus error can be accurately detected is relatively small, and this in turn has led to the disadvantage that the operation of the automatic focusing apparatus is stopped even when the position of in-focus error amount detecting device deviates only relatively slightly from the in-focus position.

SUMMARY OF THE INVENTION

It is a first object of the present invention to provide an in-focus error amount detecting device which can obtain an in-focus error signal excellent in linearity and having a wide distance measurement range.

It is a second object of the present invention to obtain a stable signal for stable normalization of the in-focus signal in order to achieve said first object.

It is a third object of the present invention to provide means for indicating that the error of the in-focus error signal is great when the amount of in-focus error is detected outside the section in which the normalizing signal for the in-focus signal is stable.

It is a fourth object of the present invention to provide an automatic focusing apparatus having a great operation range by the use of the aforementioned in-focus error amount detecting device.

BRIEF DESCRIPTION OF THE DRAWINGS

In the following, one preferred embodiment of the present invention will be explained by reference to the accompanying drawings, in which.

DESCRIPTION OF THE PREFERRED EMBODIMENT

Figure 1:
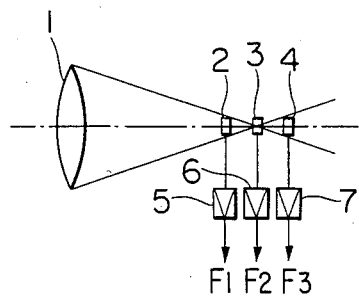
FIG. 1 shows the arrangement of light receivers for the conventional in-focus error detection.
Figure 2:
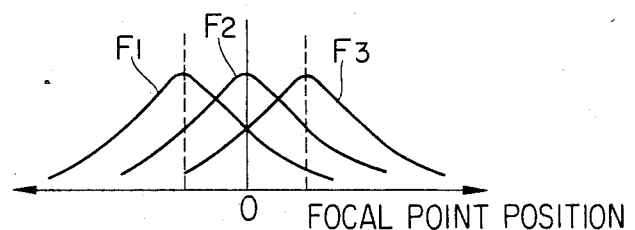
FIG. 2 shows the sharpness signals provided by the light receivers of FIG. 1.
Figure 3:
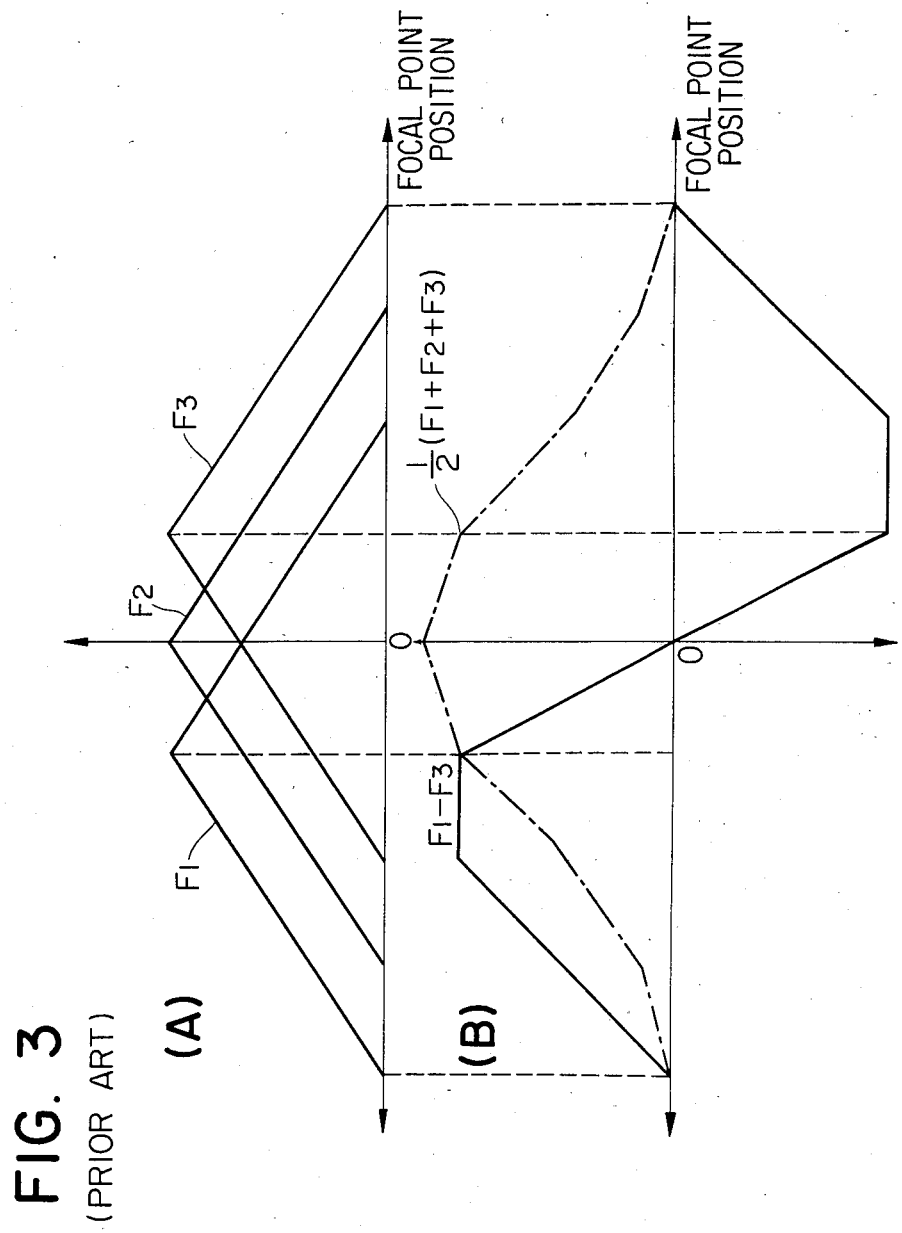
FIGS. 3(A) and (B) are model views illustrating the conventional in-focus error signal.
Figure 4:
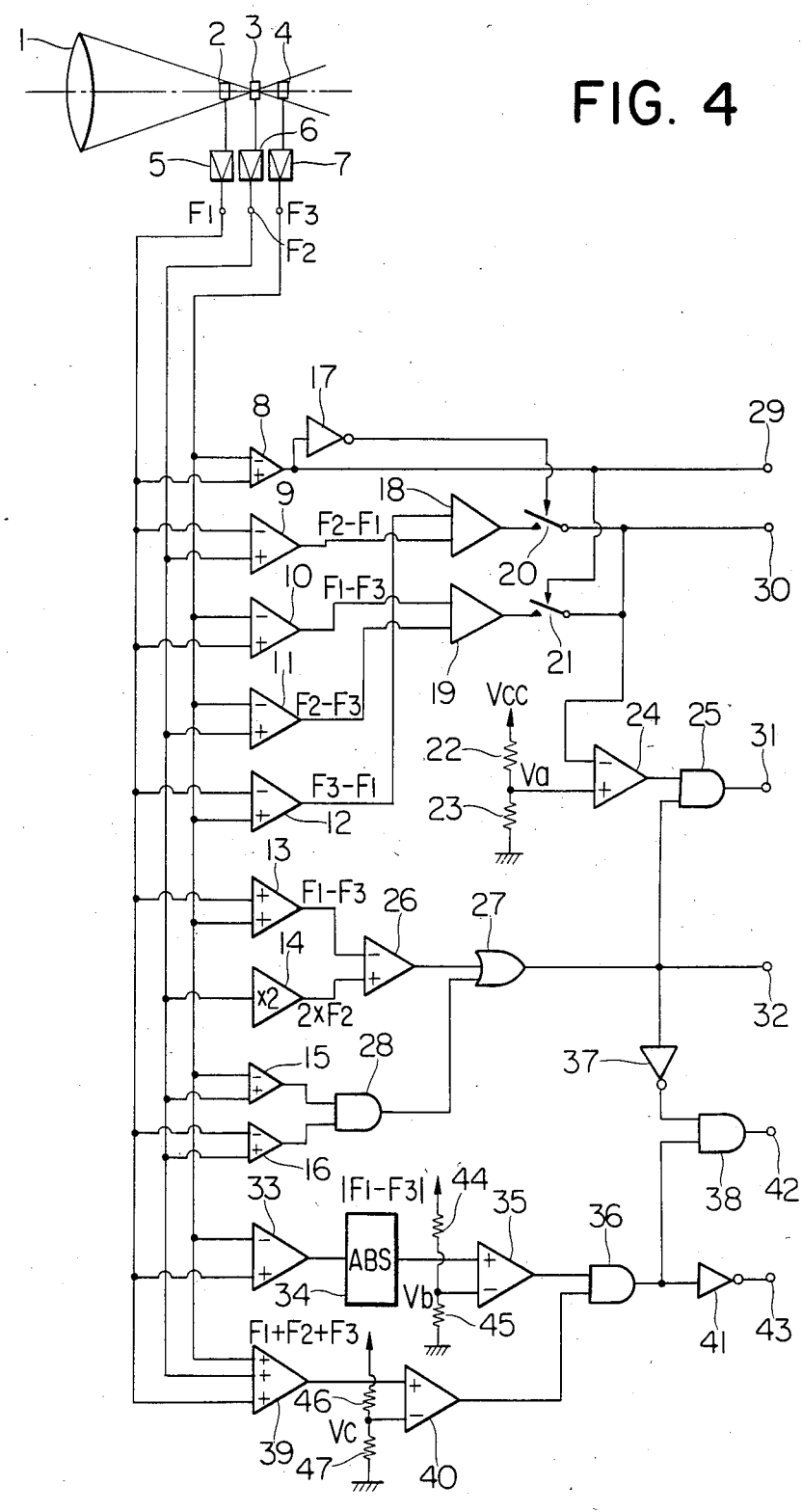
FIG. 4 is a circuit diagram showing an embodiment of the present invention.

In FIG. 4, parts similar to those in FIG. 1 are given similar reference numerals and need not be described. In FIG. 4, reference numeral 8 designates a comparator, reference numerals 9, 10, 11 and 12 denote differential amplifiers, reference numeral 13 designates an adder, reference numeral 14 denotes a multiplier, reference numerals 15 and 16 designate comparators, reference numeral 17 denotes an inverter, reference numerals 18 and 19 designate dividers, reference numerals 20 and 21 denote analog switches controlled by the outputs of the inverter 17 and the comparator 8, respectively, reference numerals 22 and 23 designate division-resistances for dividing a power source voltage Vcc and generating a reference voltage Va, reference numeral 24 denotes a comparator, reference numeral 25 designates an AND gate, reference numeral 26 denotes a comparator, reference numeral 27 designates an OR gate, reference numeral 28 denotes an AND gate, reference numeral 29 designates a near/far indication signal terminal which puts out a high level signal when the focal plane is forwardly of a predetermined focal plane and puts out a low level signal when the focal plane is rearwardly of the predetermined focal plane, reference numeral 30 denotes an in-focus error signal terminal, reference numeral 31 designates an in-focus region signal terminal, reference numeral 32 denotes an effective indication signal terminal which puts out an effective indication signal indicative of the effectiveness of the in-focus error signal, reference numeral 33 designates a differential amplifier for operating the difference between processing circuits 5 and 6, reference numeral 34 denotes an absolute-value circuit for taking the absolute value of the output of the differential amplifier 33, reference numeral 35 designates a comparator for comparing the output of the absolute-value circuit 34 with a reference value Vb, reference numeral 36 denotes an AND gate, reference numeral 37 designates an inverter for inverting the output of the OR gate 27, reference numeral 38 denotes an AND gate, reference numeral 39 designates an adder for operating the sum of the outputs of the processing circuits 5, 6 and 7, reference numeral 40 denotes a comparator for comparing the output of the adder 39 with a reference value Vc, reference numeral 41 designates an inverter, reference numeral 42 denotes an effective indication signal terminal for indicating that the in-focus error signal is not effective but only the near/far indication signal is effective, and reference numeral 43 designates a signal terminal for indicating that neither of the in-focus error signal and the near/far indication signal are effective, that is, in-focus detection cannot be effected. Reference numerals 44 and 45 designate divisional resistances for generating the reference value Vb, and reference numerals 46 and 47 denote division resistances for generating the reference value Vc.

Figure 5:
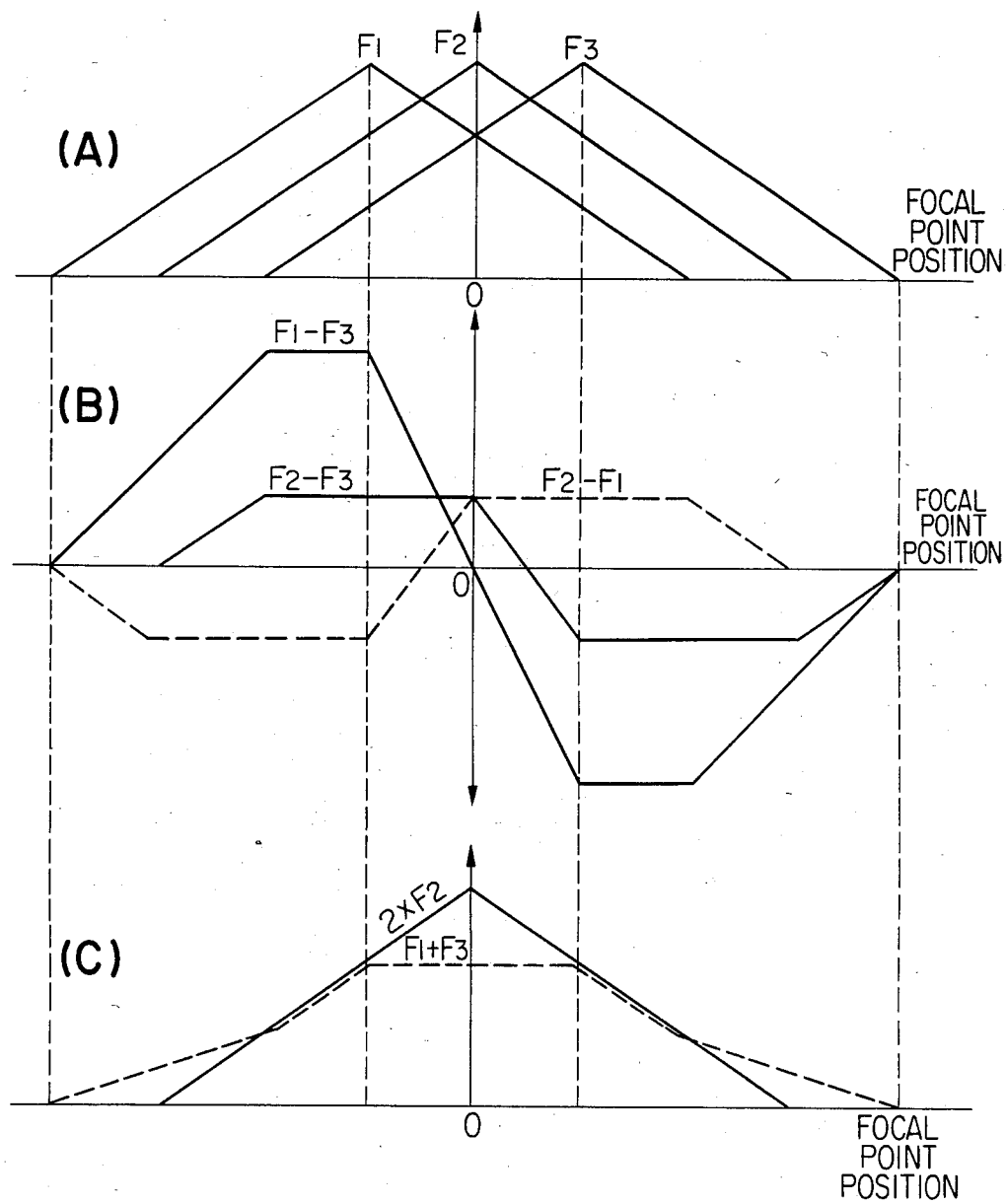
FIGS. 5(A), (B) and (C) are model views illustrating the in-focus error signal according to the present invention.

Operation will now be described by reference to FIG. 5. As shown in FIG. 5(B), in the range in which the focal plane is forwardly of the predetermined focal plane, the difference ($F_2-F_3$) between the central sharpness signal $F_2$ and the smaller one $F_3$ of the sharpness signals at the opposite ends is constant over a long range, and in the range in which the focal plane is rearwardly of the predetermined focal plane, a similar difference ($F_2-F_1$) is constant over a long range and therefore, the difference ($F_2-F_3$) or ($F_2-F_1$) is used as a normalizing signal.

When the focal plane is forwardly of the predetermined focal plane, the sharpness signal $F_1$ is greater than the sharpness signal $F_3$ and therefore, the comparator 8 puts out a high level signal and closes the switch 21. On the other hand, the difference ($F_1-F_3$) put out from the differential amplifier 10 is divided by the difference ($F_2-F_3$) put out from the differential amplifier 11 in the divider 19. In this manner, the normalized in-focus error signal ($F_1-F_3$)/($F_2-F_3$) is put out from the in-focus error signal terminal 30 via the switch 21.

When the focal plane is rearwardly of the predetermined focal plane, the sharpness signal $F_3$ is greater than the sharpness signal $F_1$ and therefore, the comparator 8 puts out a low level signal and closes the switch 20 via the inverter 17. At the same time, in puts out a low level signal to the near/far indication signal terminal and indicates that the focal plane is rearwardly of the predetermined focal plane. On the other hand, the difference ($F_3-F_1$) put out from the differential amplifier 12 is divided by the difference ($F_2-F_1$) put out from the differential amplifier 9 in the divider 18. In this manner, the normalized in-focus error signal ($F_3-F_1$)/($F_2-F_1$) is put out from the in-focus error signal terminal 30 via the switch 20.

Such in-focus error signal has been normalized by the difference ($F_2-F_3$) or the difference ($F_2-F_1$) which assumes a predetermined value even if it passes the peak values of the sharpness signals $F_1$ and $F_3$ and therefore, it is excellent in linearity and has a wide range of linearity.

The in-focus error signal deviates from the range of linearity and does not assume a proper value when the out-of-focus becomes great. It is therefore necessary to judge whether the in-focus error signal is within the range of linearity. In the past, such judgment has been made from the fact that the central sharpness signal $F_2$ is greater than the sharpness signals $F_1$ and $F_3$ at the opposite ends. In the present embodiment, as in the prior art, the conditions that $F_2>F_1$ and $F_2>F_3$ are detected by the comparators 15, 16 and the AND gate 28, whereby an effective indication signal is put out from the effective indication signal terminal 32 via the OR gate 27 and at the same time, the condition that $2\times F_2>(F_1+F_3)$ is detected by the adder 13, the multiplier 14 and the comparator 26 to indicate the effectiveness in a wider range, whereby the effective indication signal is put out from the effective indication signal terminal 32 via the OR gate 27. As shown in FIG. 5(C), the range of $2\times F_2>(F_1+F_3)$ is coincident with the range of linearity and thus, the effective indication range has been widened to its maximum.

Also, when the out-of-focus becomes great, there is a case where the in-focus error signal deviates from the range of linearity and does not assume a proper value but only the near/far indication signal is reliable. In the present invention, this is judged as a case where the output $F_1+F_2+F_3$ of the adder 39 is higher than a certain reference level Vc and the absolute value $|F_1-F_3|$ of the output of the differential amplifier 33 is higher than a reference level Vb and the effective indication signal is not put out from the OR gate 27 to the terminal 32. Also, in the present invention, the fact that the out-of-focus has become even greater and both of the in-focus error signal and the near/far indication signal have become unreliable to render judgment impossible is judged as a case where $F_1+F_2+F_3$ is lower than the reference level Vc or $|F_1-F_3|$ is lower than the reference level Vb.

Accordingly, the in-focus error amount detecting device of the present invehtion is applicable to the Automatic Focusing Device invented by the present inventor and filed in the United States (Ser. No. 448,693) and the Automatic Focusing Device also invented by the present inventor and filed in the United States (Ser. No. 448,742). For example, where the device of the present invention is applied to the Automatic Focusing Device of Ser. No. 448,693, the terminals 102, 103, 104, 105 and 106 of the circuit of FIG. 5 of the same application can be connected to the terminals 43, 42, 29, 32 and 30, respectively, of the circuit of FIG. 4 of the present application.

The in-focus error signal is compared with a reference voltage Va by the comparator 24 to indicate the in-focus region and when the in-focus error signal is lower than the reference voltage Va and within the effective range, the AND gate 25 puts out a high level in-focus region signal from the in-focus region signal terminal 31.

In the present embodiment, the differential amplifiers 10 and 12 correspond to the operational means of the present invention, and the comparator 8, the differential amplifier 9, 11, the inverter 17, the dividers 18, 19 and the switches 20, 21 correspond to the normalizing means.

The operation of the in-focus error signal is not limited to the analog operation as in the embodiment shown, but design may also be made such that the sharpness siganls $F_1$ to $F_3$ are A/D-converted to thereby effect a digital operation. Also, the judgment of the effectiveness of the in-focus error signal may be constituted only by the logic that "the sharpness signal $F_2$ is greatest".

The central light receiver 3 need not always be positioned in the predetermined focal plane. If the distance from the predetermined focal plane is accurately known in advance, that distance may always be added.

Also, to display the signals of the terminals 31, 32, 42 and 43 shown in the embodiment of FIG. 4, LEDs directly driven, for example, by the signals of the respective terminals may be provided within the viewfinder.

According to the present invention, as described above, there is provided normalizing means for operating as the in-focus error signal the ratio of the difference between the sharpnesses of the images on the light receivers at the opposite ends to the difference between the sharpness of the image on the central light receiver and the smaller one of the sharpness of the images on the light receivers at the opposite ends and therefore, there can be obtained an in-focus error signal which is excellent in linearity and which has a wide range of linearity.

What we claim is:

1. A focus detecting system comprising:
   (a) three light receiving means disposed in a plane equivalent to the vicinity of a predetermined focal plane and forwardly and rearwardly of said plane;
   (b) operational means for operating the difference between the sharpness of the images on the light receiving means at the opposite ends, of said three light receiving means;
   (c) normalizing signal generating means for operating the difference between the sharpness of the image on the central light receiving means of said three light receiving means and the smaller one of the sharpness of the images on the light receiving means at the opposite ends; and
   (d) in-focus error signal generating means for finding the ratio of the output of said operational means to the output of said normalizing signal generating means and putting out an in-focus error signal that indicates the degree of deviation of the central light receiving means from an in-focus position.

2. A focus detecting system according to claim 1, further comprising:
   (a) first operational means for operating two times the sharpness of the image on the central light receiving means of said three light receiving means;
   (b) second operational means for operating the sum of the sharpness of the images on the light receiving means at the opposite ends, of said three light receiving means; and
   (c) effective indication signal generating signal indicative of the fact that the output of said in-focus error signal generating means is effective when the output of said first operational means is greater than the output of said second operational means.

3. A focus detecting system according to claim 2, further comprising:
   (a) first reference level generating means;
   (b) detecting means for detecting that the output of said in-focus error signal generating means is smaller than the output of reference level generating means; and
   (c) in-focus region signal generating means for judging an in-focus state and generating an in-focus region signal when said detecting means detects that the output of said in-focus error signal generating means is smaller than the output of said reference level generating means and the effective indication signal is put out by said effective indication signal generating means.

4. A focus detecting system according to claim 3, further comprising:
   (a) third operational means for operating the sum of the outputs of said three light receiving means;
   (b) second reference level generating means;
   (c) fourth operational means for operating the absolute value of the difference between the outputs of the light receiving means at the opposite ends, of said three light receiving means;
   (d) third reference level generating means; and
   (e) in-focus judgment impossibility signal generating means for comparing the output of said third operational means with the output of said second reference level generating means and generating an in-focus judgment impossibility signal indicative of the impossibility of in-focus judgment when the output of said third operational means is smaller than the output of said second reference level generating means or for comparing the output of said fourth operational means with the output of said third reference level generating means and generating the in-focus judgment impossibility signal when the output of fourth operational means is smaller than the output of said third reference level generating means.

5. A focus detecting system according to claim 4, further comprising:
   (a) near/far indication signal generating means for comparing the sharpnesses of the images on the light receiving means at the opposite ends, of said three light receiving means, thereby detecting whether the focal plane is forwardly or rearwardly of the predetermined focal plane and generating a near/far indication signal.

6. A focus detecting system according to claim 5, further comprising:
   (a) means adapted to generate a signal indicating that the output of said in-focus error signal generating means is effective and the output of said near/far indication signal generating means is effective when it is judged by said effective indication signal generating means that the in-focus error signal is ineffective and it is judged by said in-focus judgment impossibility signal generating means that in-focus judgment is not impossible.

7. A focus detecting system according to any one of claims 1 to 6, wherein the signals generated by said system are used for lens control.

8. A focus detecting system according to any one of claims 1 to 6, wherein the signals generated by said system are used for display.

9. A focus detecting system according to any one of claims 1 to 6, wherein each of said light receiving means includes:
(a) a light receiver comprising a photoelectric conversion element; and
(b) processing means adapted to put out a sharpness signal proportional to the sharpness of the image formed on said light receiver.

10. A focus detecting system comprising:
(a) three light receiving means disposed in a plane equivalent to the vicinity of a predetermined focal plane and forwardly and rearwardly of said plane;
(b) operational means for operating the difference between the sharpness of the images on the light receiving means at the opposite ends, of said three light receiving means;
(c) normalizing signal generating means for generating a normalizing signal in accordance with the sharpness of the images on the said three light receiving means;
(d) in-focus error signal generating means for finding the ratio of the output of said operational means to the output of said normalizing signal generating means and putting out an in-focus error signal;
(e) first operational means for operating two times the sharpness of the image on the central light receiving means of said three light receiving means;
(f) second operational means for operating the sum of the sharpness of the images on the light receiving means at the opposite ends, of said three light receiving means; and
(g) effective indication signal generating means adapted to put out an effecitve indication signal indicative of the fact that the output of said in-focus error signal generating means is effective when the output of said first operational means is greater than the output of said second operational means.

* * * * *

UNITED STATES PATENT AND TRADEMARK OFFICE
CERTIFICATE OF CORRECTION

PATENT NO. : 4,568,168
DATED : February 4, 1986
INVENTOR(S) : Sakai et al.

It is certified that error appears in the above-identified patent and that said Letters Patent is hereby corrected as shown below:

Column 2, line 50, change "desigantes" to --designates--.

Column 3, line 61, change "in" to --it--.

Column 4, line 48, change "invehtion" to --invention--.

Column 5, line 2, change "amplifier" to --amplifiers--.

Column 5, line 8, change "siganls" to --signals--.

Column 5, line 64, change "generating signal" to --generating means adapted to put out an effective indication signal--.

Signed and Sealed this

Twenty-eighth Day of October, 1986

[SEAL]

Attest:

DONALD J. QUIGG

*Attesting Officer*   *Commissioner of Patents and Trademarks*